United States Patent [19]
Bouscher et al.

[11] Patent Number: 5,135,265
[45] Date of Patent: Aug. 4, 1992

[54] MULTIPLE PASSAGE CONDUIT ASSEMBLY

[75] Inventors: Lawrence E. Bouscher, Concord; Richard D. Clark, Chagrin Falls; Norman P. Sutterer, Hudson, all of Ohio

[73] Assignee: The Lamson & Sessions Co., Cleveland, Ohio

[21] Appl. No.: 644,848

[22] Filed: Jan. 23, 1991

[51] Int. Cl.⁵ .............................................. F16L 39/04
[52] U.S. Cl. ................................. 285/137.1; 138/112; 285/903
[58] Field of Search .................... 285/137.1, 903, 300, 285/179; 138/111, 112, 113; 350/96.2, 96.22; 403/223, 291

[56] References Cited

U.S. PATENT DOCUMENTS

| | | |
|---|---|---|
| 2,832,374 | 4/1958 | November . |
| 3,590,855 | 7/1971 | Woollen .............................. 138/111 |
| 3,789,129 | 1/1974 | Ditscheid . |
| 3,866,670 | 2/1975 | Cramer et al. ....................... 138/111 |
| 4,140,367 | 2/1979 | Makuch et al. .................. 350/96.22 |
| 4,148,495 | 4/1979 | Van Zon ............................ 285/137.1 |
| 4,303,105 | 12/1981 | Rohner ............................... 138/113 |
| 4,529,009 | 7/1985 | Horner et al. ...................... 138/111 |
| 4,570,678 | 2/1986 | Ziemek et al. . |
| 4,630,847 | 12/1986 | Blenkush ........................... 285/137.1 |
| 4,709,730 | 12/1987 | Zwilling . |
| 4,718,568 | 1/1988 | Dal Palu . |
| 4,741,593 | 5/1988 | Fochler . |
| 4,754,782 | 7/1988 | Grantham . |
| 4,756,594 | 7/1988 | Tiberio .............................. 350/96.22 |
| 4,834,825 | 5/1989 | Adams et al. ........................ 138/112 |
| 4,854,664 | 8/1989 | McCartney ...................... 350/96.22 |
| 4,865,354 | 9/1989 | Allen ................................. 285/137.1 |

Primary Examiner—Eric K. Nicholson
Attorney, Agent, or Firm—Fay, Sharpe, Beall, Fagan, Minnich & McKee

[57] ABSTRACT

A flexible, multiple passage conduit assembly for use in fiber optic systems comprises an outer elongated housing formed from circumferentially corrugated flexible plastic conduit of cylindrical configuration. A separate rigid end fitting member of generally cylindrical configuration is joined to each end of the conduit to close the ends and allow for joining the assembly to associated multiple passage conduits. A plurality of lengths of hollow flexible plastic tubing are located within the conduit housing to extend the length thereof. The lengths of tubing terminate in open ends adjacent the end fittings. The open ends of the tubing are connected to the end fitting members by connections which permit relative axial movement between the lengths of tubing and at least one of the end fitting members.

7 Claims, 3 Drawing Sheets

MULTIPLE PASSAGE CONDUIT ASSEMBLY

BACKGROUND OF THE INVENTION

The subject invention is directed toward the art of tubular conduits and fittings and, more particularly, to a flexible, multiple passage conduit assembly.

In its preferred embodiment, the assembly constitutes a flexible elbow or "sweep" for joining multiple passage conduit runs as used in fiber optic communications systems. It should become apparent, however, that the invention could take many different forms for use in many different conduit or piping systems.

In fiber optic communications systems, it is common to use multiple passage conduit assemblies to house the bundles of optical fibers and protect them from the ambient environment. The conduit assemblies typically comprise, for example, lengths of relative large diameter plastic conduit each of which forms an outer housing and carries a group of smaller diameter tubings that form the separate individual passages.

The assemblies include end fittings which permit the separate lengths to be readily joined to allow fabrication of multiple passage assembly runs of any desired length. Elbows, splice cases, and the like, provide means for changing direction in the runs.

In many systems and installations there is a need for flexible elbow or "sweep" elements so that directional changes of any desired angle can be made as needed and the systems do not have to be designed around fixed angle elbows.

BRIEF STATEMENT OF THE INVENTION

The subject invention provides a highly efficient and effective flexible conduit assembly which is particularly suited for use as a sweep element in a multiple passage conduit system for use in fiber optic communications. According to the invention, the conduit assembly comprises a first length of cylindrical, circumferentially corrugated flexible hollow conduit formed of plastic and terminating in spaced ends. A plurality of second lengths of hollow flexible plastic tubing of a smaller diameter than the conduit is positioned longitudinally within the interior of the conduit to extend substantially the length thereof. At each end of the first length of conduit there are separate rigid cylindrical end fitting coupling members sealingly joined thereto to close the ends and seal the interior of the conduit. The end fitting coupling members permit connection of the assemblies one to another to allow fabrication of runs of any desired length. Each end fitting coupling member is arranged to include a number of axially extending cylindrical through passages equal to the number of second lengths of tubing positioned within the interior of the conduit. Connecting means are provided for joining the open ends of the interior tubings with the cylindrical through passages in the end fitting coupling members to provide a number of continuous passages longitudinally of the first length of conduit between the end fitting coupling members. The connecting means include means for permitting relative axial displacement between the ends of the tubing and at least one of the end fitting coupling members so that the assembly may be selectively flexed and bent to a desired angle.

In accordance with a more limited aspect of the invention, the connecting means include a slip joint connection between at least one end of each length of interior tubing and an associated one of the end fitting coupling members.

According to a further aspect of the invention, the lengths of interior tubing are circumferentially corrugated and have one of their ends bonded to an associated end fitting while the other end is mounted in the previously mentioned slip joint connection.

In accordance with yet another aspect of the invention, the end fittings are preferably adhesively bonded to the ends of the outer conduit and each end fitting coupling member includes a cylindrical outer sleeve which closely surrounds an end of the conduit and is bonded thereto.

In accordance with a still further aspect of the invention, the end fitting coupling members each include an inner body portion which is sized to be closely received within an open end of the housing defining conduit. The inner body portion is preferably adhesively bonded into place in the conduit end.

As can be seen from the foregoing, a primary object of the invention is the provision of a flexible multiple conduit assembly which is simple in construction and designed so that flexing can take place without undue strain being applied to any of the various components of the assembly.

A still further object of the invention is the provision of a multiple conduit assembly of the class under consideration wherein the individual components are generally commercially available plastic tubing and conduit joined by simple easily molded end fitting coupling members.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENTS

Figure 1:
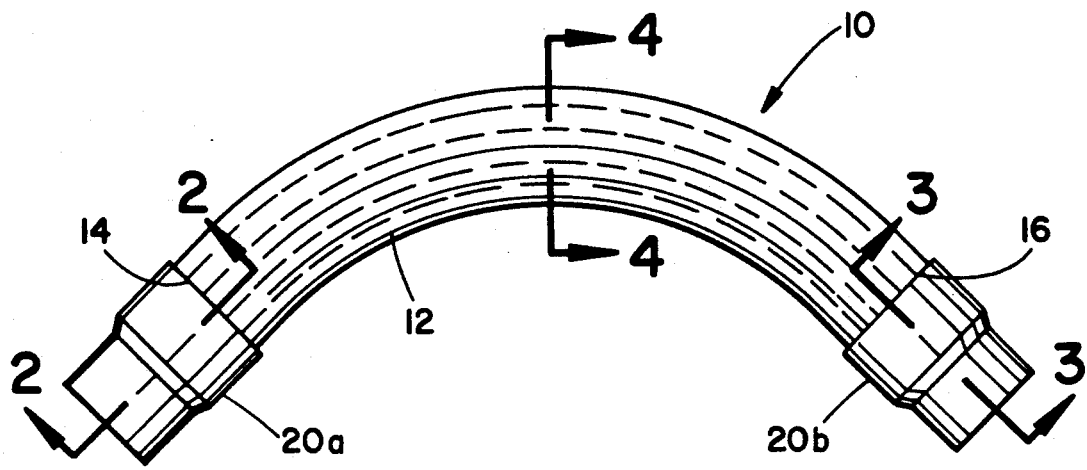
FIG. 1 is a side elevational view of a elbow or sweep element formed in accordance with the subject invention.
Figure 4:
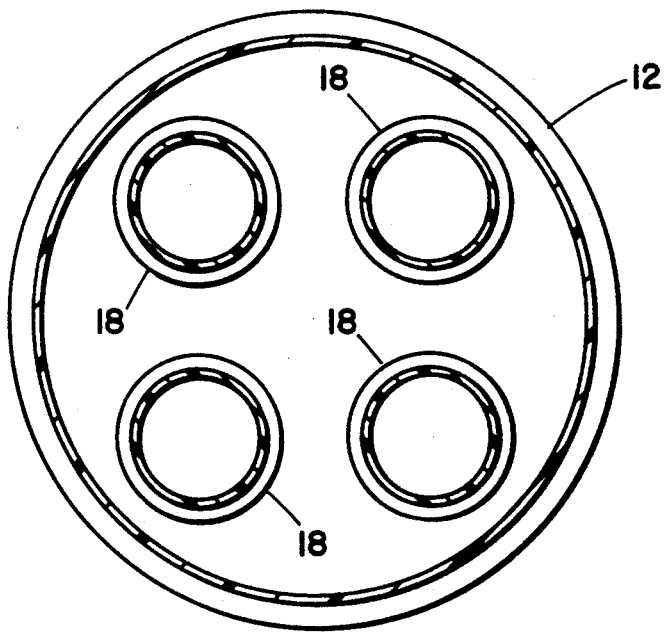
FIG. 4 is a cross-sectional view taken on line 4—4 of FIG. 1.
Figure 2:
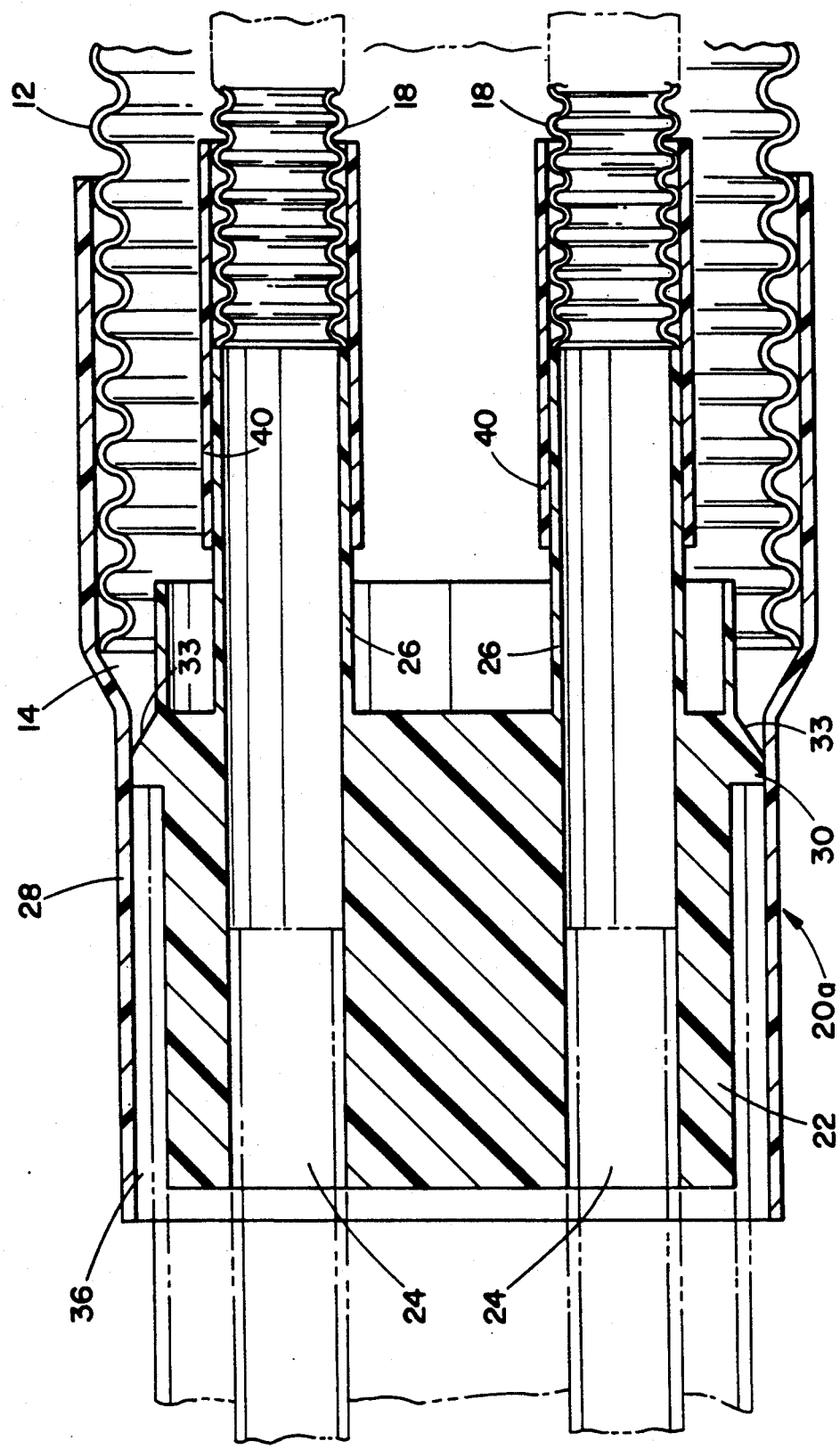
FIG. 2 is a longitudinal cross-sectional view taken on line 2—2 of FIG. 1.
Figure 3:
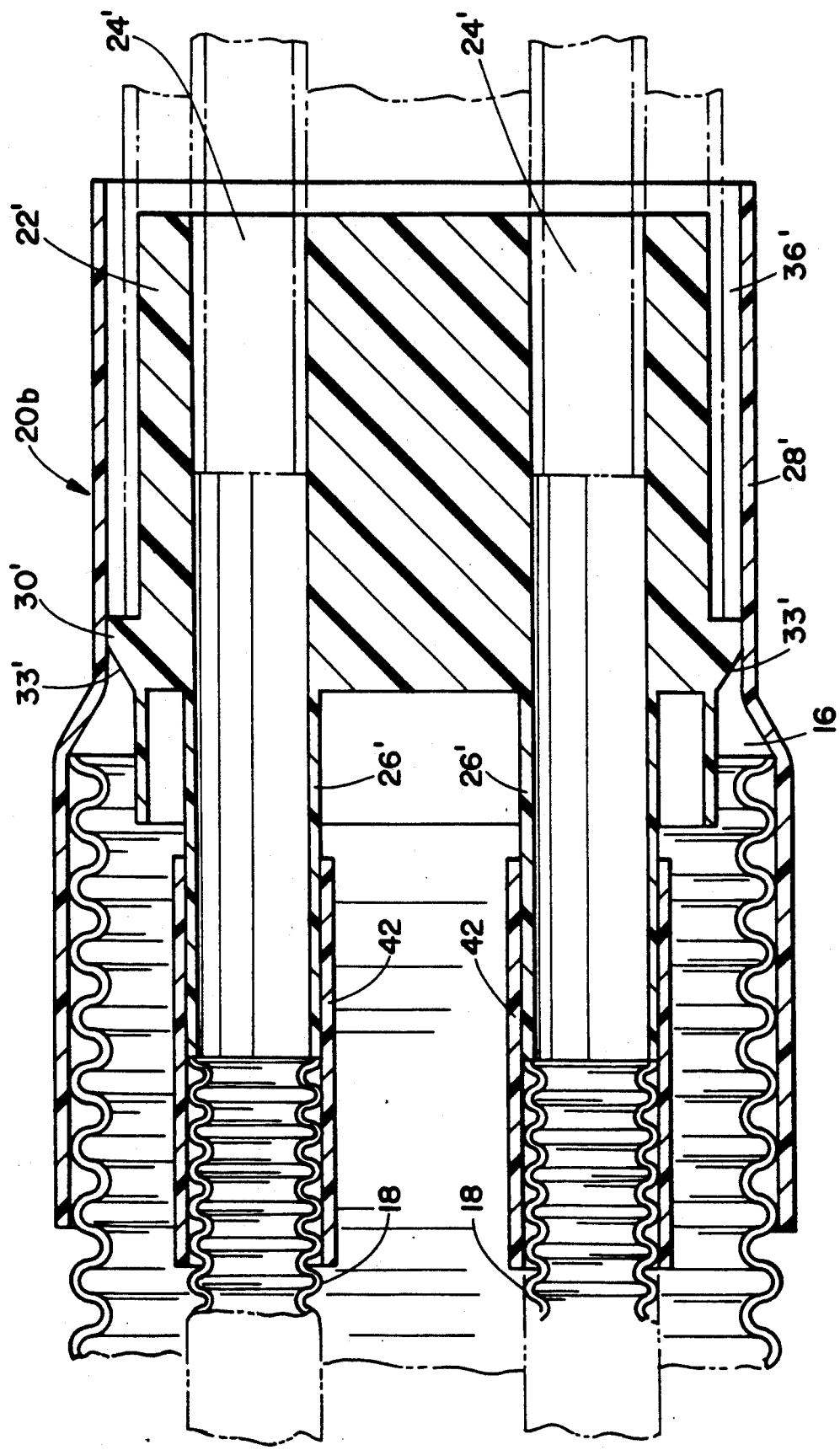
FIG. 3 is a view similar to FIG. 2 but taken on line 3—3 of FIG. 1.

Referring more particularly to the drawings wherein the showings for the purpose of illustrating a preferred embodiment of the invention only and not the purpose of limiting same, FIGS. 1 through 3 illustrate a flexible elbow or sweep member which is particularly suited and designed for use in multiple passage duct systems of the type used for housing bundles of optical fibers. Broadly, the structure shown comprises a flexible and generally cylindrical outer housing 12 formed from a length of circumferentially corrugated resinous plastic conduit formed with an outer wall having a length "L" and terminating in open circular ends 14 and 16. The conduit 12 is a standard commercially available conduit having a multiplicity of closely spaced corrugations which provide it with substantial lateral flexibility and the ability to undergo some slight elongation. The conduit 12 forms a liquid-tight outer housing for the assembly and carries within its interior a plurality of smaller diameter lengths of tubing which are positioned in closely spaced relationship and extend the length of the conduit 12. The internal tubings provide separate individual passages longitudinally of the assembly. The actual number and arrangement of the internal tubing members 18 could vary significantly. In the subject embodiment, there are shown, as best seen in FIG. 4, four individual tubing members 18 positioned in a generally rectangular pattern. It should also be appreciated that various internal supports and spaces can be provided to locate the tubing members and maintain them properly spaced.

The internal tubing members 18 are, in the preferred embodiment, formed of plastic and provided with circumferentially extending closely spaced corrugations which allow these tubing members to have substantial flexibility to permit them to be bent easily. Additionally, as is well known, the circumferentially extending interior corrugations in the inner tubular members reduce the friction encountered when pulling fiber optic cables through the tubing members.

The ends of the main outer housing or casing conduit 12 are closed and sealed by separate end fitting coupling members 20a and 20b. The end fitting coupling members 20a and 20b have a generally cylindrical configuration and are molded from plastic to have a relatively rigid construction. As illustrated, the coupling members comprise an inner body portion 22 which is of cylindrical shape and includes a number of through passages 24 of circular cross-section. As will subsequently become apparent, the number of through passages 24 corresponds to the number of inner tubing members 18 positioned within the outer casing or conduit section 12.

The inner body portion 22 further includes tubular sleeve-like members 26 which, in the subject embodiment, are molded directly to the inner body portion 22 and extend generally axially therefrom about the terminal ends of the through passages 24. As illustrated, the sleeve-like members 26 have an outer diameter which generally corresponds to the maximum outer diameter of the tubular members 18. The inner diameter preferably generally corresponds to the open inner diameter of the tubular members 18.

An outer tubular sleeve member 28 is connected to the inner body portion 22 by way of a radially extending flange portion 30 which is bonded or adhesively joined at its outer periphery 32 to the interior of the body sleeve 20. The right side (as viewed in FIG. 2) of the flange 30 is inclined as shown at 33 to facilitate assembly in sleeve 28. The outwardly extending flange 30 serves to space the sleeve from the exterior of the inner body portion 22 and thereby provides a circumferentially extending annular opening 36 between the sleeve and the body portion 22. This annular opening provides a suitable gasket receiving seal chamber when the sweep element 10 is connected to an associated rigid straight length of multiple passage duct as illustrated in phantom in FIGS. 2 and 3.

The end fitting coupling member 20b has substantially the same construction as the end fitting 20a and, accordingly, duplicate reference numerals differentiated by a prime suffix have been used to identify the same or corresponding elements. The numerals so used with respect to the one element are to be taken as equally applicable to other elements so designated unless otherwise noted.

The ends of the inner tubing members 18 is are respectively joined to corresponding ones of the sleeve-like extensions 26 and 26'. According to the subject invention, at least one end of each of the tubing members 18 is joined in a manner to permit relative axial movement between the tubing member 18 and the associated end coupling member. This is accomplished through the use of slip coupling elements 40 located between the end fitting coupling member 20a and the inner tubing members 18. Specifically, each of the sleeve-like slip coupling elements 40 are adhesively bonded to an end of the tubing members 18 and slidably received on the outwardly extending tubular sleeve-like sections 26. The internal diameter of the sleeve members 40 are sized so as to closely and slidably receive the sleeve-like members 26 in the manner illustrated. This allows free sliding movement between the components while effectively locating the inner tube members in alignment with the through passages 24.

At the end fitting coupling member 20b, a similar arrangement of tubular members 42 is provided. These tubular members 42 are likewise sized so as to closely receive the outwardly extending tubular sections 26 which extend from the inner body portion 22'. These tubular members 42 can be freely slidably received on the associated portions 26' or they can be bonded thereto. The important aspect is that at least one or the other ends of each of the inner tubular members 18 should be permitted to have relative sliding movement so that when the assembly is bent, the necessary length compensation can take place. The necessity for this is readily apparent when it is recognized that bending of the assembly varies the distance between the end fitting members 16 and 14 and requires that there be relative elongation and/or shortening of the inner tubing members relative to one another when bending takes place. The degree of relative change depends on the radius and arcuate degree of bend. With the subject invention, the assembly can be bent to substantially any reasonable radius and through a large arcuate range.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. A flexible conduit assembly comprising:
 a first length of cylindrical, circumferentially corrugated flexible hollow conduit formed of plastic and terminating in spaced ends;
 a plurality of second lengths of hollow flexible corrugated plastic tubing terminating in open ends and positioned within the interior of said first length of conduit to extending substantially the length thereof;
 a separate rigid cylindrical end fitting coupling member sealingly bonded to each end of the first length of conduit to close the ends and seal the interior of the first length of conduit, each end fitting coupling member including a number of axially extending cylindrical through passages equal to the number of second lengths of tubing within the interior of said conduit; and,
 connecting means joining the open ends of the tubing with the cylindrical through passages in the end fitting coupling members to provide a number of continuous separate passages longitudinally of said first length of conduit between the end fitting coupling members, said connecting means including slip coupling means for permitting relative axial sliding displacement between at least one end of each length of tubing and the end fitting coupling members.

2. The conduit assembly as defined in claim 1 wherein said lengths of tubing are cylindrical and circumferentially corrugated.

3. The conduit assembly as defined in claim 1 wherein one end of each length of tubing is bonded to one of said end fitting coupling members.

4. The conduit assembly as defined in claim 3 wherein the end fitting coupling members each include a cylindrical outer sleeve which closely surrounds an end of the conduit and is bonded thereto.

5. The conduit assembly as defined in claim 4 wherein each end of the conduit is bonded to one of the end fitting coupling members.

6. The conduit assembly as defined in claim 5 wherein said end fitting coupling members are formed of a resinous plastic material.

7. The conduit assembly as defined in claim 6 wherein each said end fitting coupling member includes axially extending sleeves for defining a portion of said connecting means.

* * * * *